(12) United States Patent
Pfaller et al.

(10) Patent No.: US 11,904,418 B2
(45) Date of Patent: Feb. 20, 2024

(54) METHOD AND APPARATUS FOR QUICK SELECTION OF CUSTOM PARAMETERS AND FACTORY RESET PARAMETERS

(71) Applicant: Illinois Tool Works Inc., Glenview, IL (US)

(72) Inventors: Andrew Pfaller, Hilbert, WI (US); Brian J. Bornemann, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 362 days.

(21) Appl. No.: 16/857,834

(22) Filed: Apr. 24, 2020

(65) Prior Publication Data

US 2020/0363793 A1     Nov. 19, 2020

Related U.S. Application Data

(60) Provisional application No. 62/847,637, filed on May 14, 2019.

(51) Int. Cl.
    *B23K 9/10*      (2006.01)
    *B23K 9/127*      (2006.01)
    *G05B 19/418*      (2006.01)

(52) U.S. Cl.
    CPC ............ *B23K 9/1062* (2013.01); *B23K 9/127* (2013.01); *G05B 19/4183* (2013.01);
    (Continued)

(58) Field of Classification Search
    CPC .... B23K 9/1062; B23K 9/127; B23K 9/0953; G05B 19/4183; G05B 19/4188; G05B 19/41885; G05B 19/41865
    See application file for complete search history.

(56) References Cited

U.S. PATENT DOCUMENTS 9,481,050 B2 * 11/2016 Brine ..................... B23K 10/00
2002/0194337 A1 * 12/2002 Knight ................ G06F 21/6209
                                                             709/225
(Continued)

FOREIGN PATENT DOCUMENTS

EP          901865 A2 *   3/1999          ............... B23K 9/10
EP         0901865 A2    3/1999

OTHER PUBLICATIONS

The extended European search report for Application No. 20173918. 2, dated Oct. 5, 2020, pp. 1-9, European Patent Office, Germany (9 pages).

(Continued)

*Primary Examiner* — Charles Cai
(74) *Attorney, Agent, or Firm* — McAndrews, Held & Malloy, Ltd.

(57) ABSTRACT

Provided is a welding-type power source, comprising power conversion circuitry configured to convert input power to welding-type power, a user interface comprising a first input device, a second input device, and an output device, and control circuitry. The control circuitry is configured to, in response to a first input via the first input device, control the output device to output an indication that the welding-type power source is in a preconfigured state, set predetermined ones of welding-type parameters to respective predetermined values, set a welding current, when there is an input from the second input device, to a value indicated by the second input device, and set the welding current, when there is not an input from the second input device, to one of: the default value when the default welding current has not been changed, or a welding current that has been changed previously via the second input device.

19 Claims, 3 Drawing Sheets

(52) U.S. Cl.
CPC ... G05B 19/4188 (2013.01); G05B 19/41885 (2013.01); *G05B 19/41865* (2013.01)

(56) References Cited

U.S. PATENT DOCUMENTS

| | | | | |
|---|---|---|---|---|
| 2007/0056944 | A1* | 3/2007 | Artelsmair | B23K 9/092 |
| | | | | 219/130.5 |
| 2009/0173726 | A1* | 7/2009 | Davidson | B23K 9/0953 |
| | | | | 219/130.01 |
| 2015/0076121 | A1 | 3/2015 | Krupp | |
| 2015/0076129 | A1* | 3/2015 | Spear | B23K 9/1062 |
| | | | | 219/130.51 |
| 2016/0318113 | A1 | 11/2016 | Enyedy | |
| 2018/0107025 | A1* | 4/2018 | Smit | G02C 7/101 |
| 2018/0264581 | A1 | 9/2018 | Schraff | |
| 2020/0294745 | A1* | 9/2020 | Leonard | B60R 16/03 |
| 2021/0346974 | A1* | 11/2021 | Maruoka | B23K 9/1068 |

OTHER PUBLICATIONS

Communication pursuant to Article 94(3) EPC for European Application No. 20173918.2, dated Sep. 4, 2023, European Patent Office, Germany (6 pages).

* cited by examiner

METHOD AND APPARATUS FOR QUICK SELECTION OF CUSTOM PARAMETERS AND FACTORY RESET PARAMETERS

PRIORITY/CROSS REFERENCE TO RELATED APPLICATIONS

The present application claims the benefit of U.S. Provisional Patent Application Ser. No. 62/847,637, filed May 14, 2019, entitled "Method and Apparatus for Quick Selection of Custom Parameters and Factory Reset Parameters," the entire contents of which are expressly incorporated herein by reference.

BACKGROUND

The present disclosure relates to allowing a user to select parameters, and more particularly, to a method and apparatus for quick selection of custom parameters and factory reset parameters.

Limitations and disadvantages of conventional systems for selecting parameters in a welding system will become apparent to one of skill in the art, through comparison of such approaches with some aspects of the present method and system set forth in the remainder of this disclosure with reference to the drawings.

SUMMARY

Methods and systems are provided for a method and apparatus for quick selection of custom parameters and factory reset parameters, substantially as illustrated by and described in connection with at least one of the figures, as set forth more completely in the claims.

BRIEF DESCRIPTION OF THE DRAWINGS

These and/or other aspects will become apparent and more readily appreciated from the following description of some example embodiments, taken in conjunction with the accompanying drawings.

The figures are not necessarily to scale. Where appropriate, similar or identical reference numbers are used to refer to similar or identical components.

DETAILED DESCRIPTION

Various embodiments of the disclosure allow the user to easily set applicable welding parameters by toggling between stock and custom parameters by pressing a button on a user interface. Accordingly, this may eliminate the need for a user to access every parameter and search through the parameter range on screen, while allowing the user to know that the default values may be acceptable for most common applications.

When this feature is activated by pressing a button, an indicator such as, for example, a light, will illuminate as a way to quickly identify that the feature is activated. Holding the button for a period of time will perform a factory reset of the entire unit.

Accordingly, an embodiment gives the welders the simplicity of one button to set up parameters except the amperage ("heat") setting.

Various advantages of an embodiment of the disclosure may be, for example: reduce training and setup time associated with selecting the acceptable parameters; reduce product rework associated with improper parameters being utilized; eliminate or reduce the troubleshooting time by quickly allowing all applicable parameters to be set to determined custom values with the press of a button; eliminate or reduce the troubleshooting time by having the factory reset function on the front user interface; allow for the user to toggle between factory settings and custom settings for comparison/training purposes; allow the users the flexibility of setting the max amperage separately from the other parameters to achieve the output control scaling/response rates they desire; supervisors can quickly check that welders are utilizing factory parameters simply by glancing at the indicator (e.g., light or LED) on the button; etc.

Figure 1A:
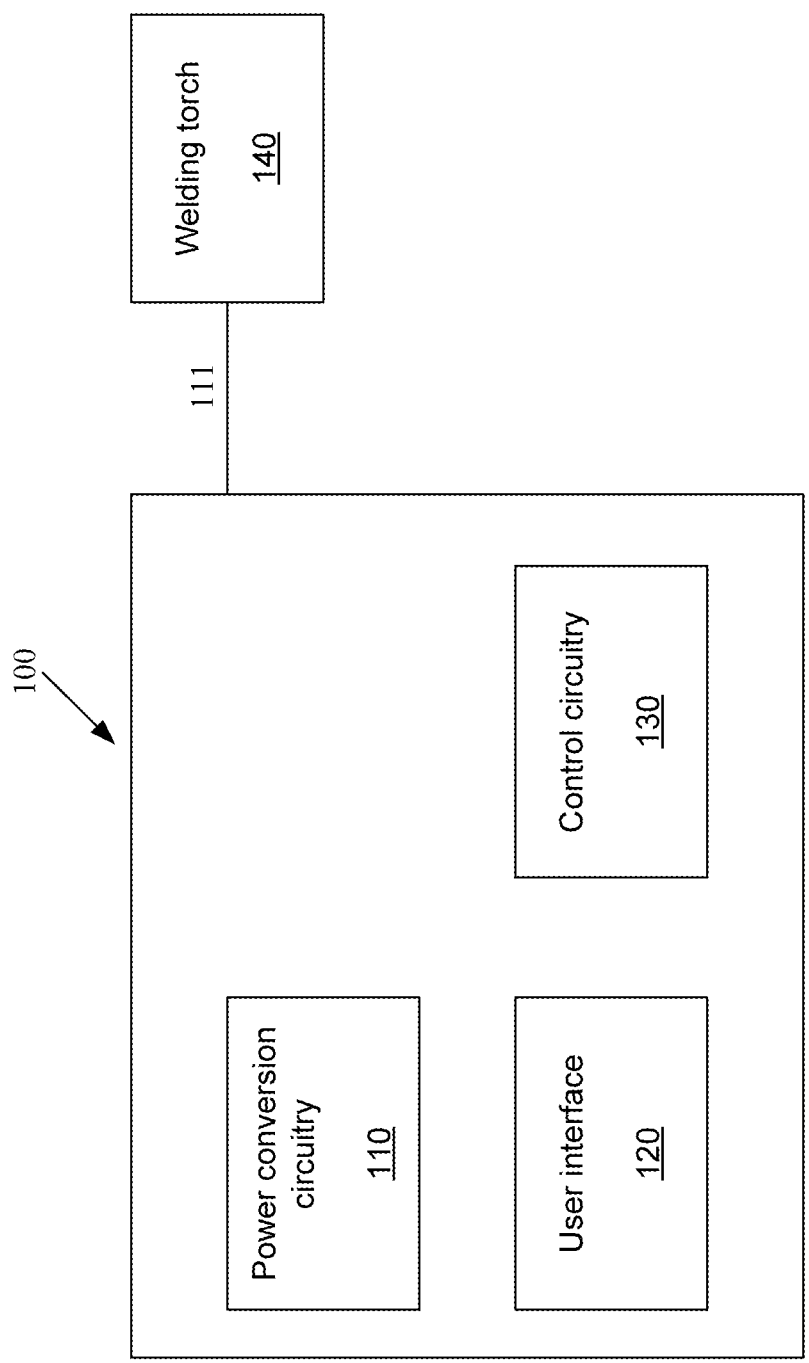
FIG. 1A is a high-level block diagram of an example welding-type power source in accordance with an embodiment of the disclosure.

FIG. 1A is a high-level block diagram of an example welding-type power source in accordance with an embodiment of the disclosure. Referring to FIG. 1A, there is shown a welding-type power source 100 that comprises power conversion circuitry 110, a user interface 120, and control circuitry 130. There is also shown a welding torch 140 that may receive welding-type power from the power conversion circuitry 110 in the welding-type power source 100 via an electric cable 111.

The power conversion circuitry 110 receives input power from, for example, a power source that may provide 120 VAC, 240 VAC, 480 VAC, etc., and outputs welding-type power. The user interface 120 provides various input and output devices for entering/controlling use of the welding-type power source 100 as well as various output devices for showing the status and/or information regarding the welding-type power source 100.

The control circuitry 130 comprises a hardware device capable of executing instructions to perform specific functions. Accordingly, the control circuitry 130 comprises any of a number of different types of processors, memory, logic circuitry, etc., for controlling the welding-type power source 100.

Figure 1B:
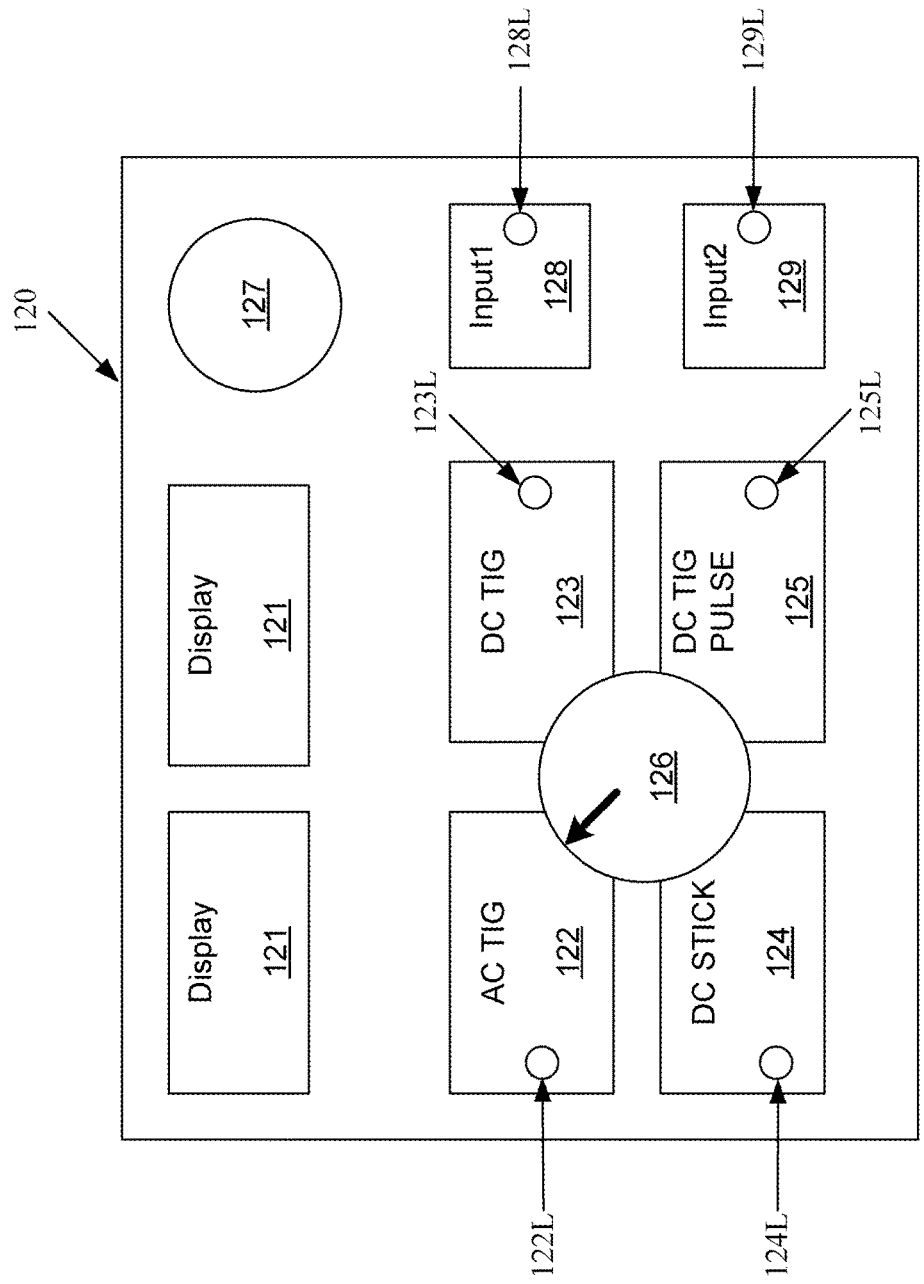
FIG. 1B is a drawing of an example user interface in accordance with an embodiment of the disclosure.

FIG. 1B is a drawing of an example user interface in accordance with an embodiment of the disclosure. Referring to FIG. 1B, there is shown the example user interface 120 from FIG. 1. The user interface (UI) 120 has displays 121. While these are shown as two separate displays, various embodiments of the disclosure may have a single display, or more than two displays.

As an example, the UI 120 may also show four selections for welding types 122-125. A welding type may be selected by, for example, the selector 126. To select a welding type, the selector 126 may be turned until the arrow points to the specific welding type. Each of the welding types 122-125 may also have a corresponding light 122L-125L that may turn on when that welding type is selected. There is also an encoder 127 that may be used to increase or decrease a menu item value such as, for example, a welding current. There are also Input1 device 128 and Input2 device 129 with their respective lights 128L and 129L. The Input devices may be, for example, a push button, a toggle switch, a membrane button, etc.

The Input1 device 128 may be, for example, a menu button that, when pressed, will show various levels of menus. For example, a short press may bring up a first menu, a longer press may bring up a second menu, etc. Once a desired menu is displayed, a shorter press than the short press for the first menu may allow advancement to the next menu item. If a menu item can be adjusted in value, the encoder 127 may be used to adjust the value for the displayed menu item. The menu name may be displayed on, for example, one or both of the displays 121 for a period of time. After that, the first menu item may be displayed with its value. Accordingly, a user may select a different value for that menu item, or move on to the next menu item.

After accessing a menu, timing out by not touching the Input1 device 128 or the encoder 127 for a default amount of time may exit the menu mode. The menu mode may also be exited by, for example, pressing the Input1 device 128 for a period longer than the longest period to access the last menu. When the menu is exited, the presently set welding current may be displayed on the displays 121. For example, one display 121 may display the words "Welding Current" and the other display 121 may display the welding current in the number of amperes.

The light 128L associated with the Input1 device 128 may turn on, for example, when a menu is accessed, and turn off when the menu mode is exited.

The Input2 device 129 may be, for example, a preconfigured state button. The light 129L associated with the Input2 device 129 may turn on when the welding-type power source 100 enters the preconfigured state, and turn off when the preconfigured state is exited. The preconfigured state may be entered by pressing the Input2 device 129 when the welding-type power source 100 is not in the preconfigured state, and exited by pressing the Input2 device 129 when the welding-type power source 100 is in the preconfigured state.

When the preconfigured state is entered, the control circuitry, such as, for example, the control circuitry 130 in FIG. 1 may load a predetermined set of welding parameters for use in controlling, for example, the power conversion circuitry 110. The welding current may be displayed in the displays 121. When first powered on, the control circuitry 130 may set the welding current to a default value. If desired, a user may then adjust the welding current to a desired value using, for example, the encoder 127. While the welding current can be adjusted, all other parameters selected to be a part of the preconfigured state may not be changed. Accordingly, the preconfigured state may present a useful welding parameters for the specific welding type selected from the welding types 122-125.

Once a welding current is changed, that value is stored in the welding-type power source 100 where the change is persistent across power cycles. Accordingly, the welding current can be used in the future until it is changed. Various embodiments of the disclosure may provide a warning when an attempt is made to change any other parameter while in the preconfigured state. For example, the menu and menu items may be accessed using the Input1 device 128. However, trying to change the menu item values using the encoder 127 may result in, for example, the displays 121 flashing an error message. The error message may be flashed on and off for a period of time, or displayed constantly for a period of time. Various embodiments may, for example, blink all of the associated lights on the UI 120. Accordingly, it can be seen that various things can be done to indicate an error condition.

While the various lights 122L-125L and 128L-129L are generically described as lights, various embodiments of the disclosure may use light emitting diodes (LEDs), or any other light emitting devices. Furthermore, the welding type selected, the menu mode accessed, and/or the preconfigured state entered may all be displayed, for example, in the displays 121 in addition to being shown via the various lights 122L-125L and 128L-129L, or in place of one or more of the various lights 122L-125L and 128L-129L.

The Input1 device 128 may also be used to factory reset of the welding-type power source 100. For example, when the Input1 device 128 is pressed for a certain amount of time, a message may be displayed on the displays 121 indicating that a factory reset will take place. Keeping the Input1 device 128 pressed longer will result in a factory reset. There may be, for example, a count-down indicating how much longer the Input1 device 128 needs to be kept pressed for the factory reset. Releasing the Input1 device 128 at any time prior to the count-down ending will result in no factory reset taking place.

As explained previously, the displays 121 may display the selected welding current value. However, when a welding operation is taking place, that is when there is welding current being provided by the power conversion circuitry 110 to the welding torch 140, an actual welding current and actual welding voltage may be displayed on the displays 121. Accordingly, when the welding operation stops or pauses, that is when there is no welding current provided to the welding torch 140, the selected welding current value is again displayed on the displays 121.

Figure 2:
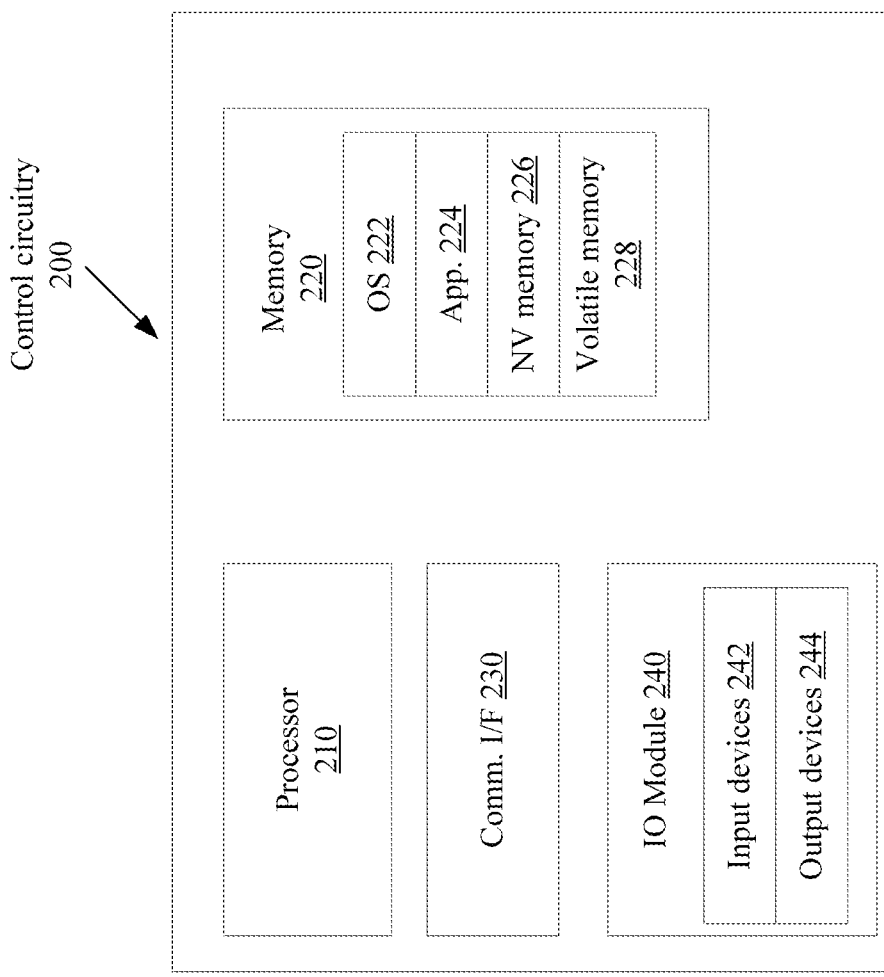
FIG. 2 shows a block diagram of an example control circuitry in accordance with an embodiment of the disclosure.

FIG. 2 shows a block diagram of an example control circuitry in accordance with an embodiment of the disclosure. Referring to FIG. 2, there is shown an example control circuitry 200 that may be used with various embodiments of the disclosure, and may be similar to the control circuitry 130 in FIG. 1A. The control circuitry 200 may comprise, for example, a processor 210, memory 220, a communication interface 230, and an IO interface 240. The processor 210 may comprise, for example, one or more of processors (CPUs, GPUs, etc.), controllers, system on chips, ASICs, etc.

The memory 220 may include non-volatile memory 226 and volatile memory 228. The storage described for holding local data may be part of the memory 220 or comprise separate memory. The operating system 222 and applications 224 may be stored in, for example, the non-volatile memory 226, and may be copied to volatile memory 228 for execution by the processor 210. Various aspects of the disclosure may use different memory architectures that are design and/or implementation dependent. For example, some aspects of the disclosure may have the operating system 222 and applications 224 in the non-volatile memory 226 executed at least in part from the non-volatile memory 226.

The communication interface 230 may allow the control circuitry 200 to communicate with other devices via, for example, a wired protocol such as USB, Ethernet, Firewire, etc., or a wireless protocol such as Bluetooth, Near Field Communication (NFC), Wi-Fi, etc. The wired or wireless protocol may also be, for example, a proprietary protocol. The various types of radios for communication may be referred to as a transceiver for the sake of simplicity. The communication may be, for example, with various sensors and/or devices that can relay sensor data. The communication interface 230 may also be used to communicate with other networks such as local networks, cellular networks, etc.

The control circuitry 200 may also comprise the IO module 240 for communication with a user via the input devices 242 and output information to be displayed on output devices 244. The input devices 242 may comprise, for example, switches, slide switches, membrane switches, buttons, touch sensitive screen, which may be a part of a display, a microphone, etc. The touch sensitive screen may have soft buttons, switches, slide switches, etc. that emulate their physical counterparts. The input devices 242 may also comprise, for example, various sensors, cameras, etc. The output devices 244 may comprise, for example, display(s), speaker(s), LED(s), vibration motor(s), etc.

The processor 210 may operate using different architectures in different embodiments. For example, the processor 210 may use the memory 220 to store instructions to execute, or the processor 210 may have its own memory (not shown) for its instructions.

Various embodiments may use other architectures where the different functionalities may be grouped differently. For example, the grouping may be in different integrated circuit chips. Or the grouping may combine different devices such as the IO module 240 and the communication interface 230 together, etc. Additionally, the control circuitry 200 may refer logically to various physical devices. For example, one or more of the output devices 244 may be at a different location than one or more of the input devices 242.

The UI 120 and the controller circuitry 130 of FIG. 1 may be similar to the control circuitry 200 of FIG. 2. Accordingly, the IO module 240 may be similar to the UI 120 and the remainder of the control circuitry 200 may be similar to the control circuitry 130 of FIG. 1.

While various electrical and mechanical devices may have been described for the user interface 120, various aspects of the disclosure may comprise different applicable devices. For example, the user interface 120 may comprise a display device 121 that is touch sensitive. Accordingly, the various devices 122-129 and/or any corresponding lights may be a part of the display device 121, or a portion of the devices 122-129 and/or any corresponding lights may be a part of the display device 121.

As can be seen, the present disclosure may provide for a welding-type power source that comprises power conversion circuitry configured to convert input power to welding-type power, a user interface comprising a first input device, a second input device, and an output device, and control circuitry. The control circuitry may be configured to, in response to a first input via the first input device, control the output device to output an indication that the welding-type power source is in a preconfigured state, set predetermined ones of welding-type parameters to respective predetermined values, set a welding current, when there is an input from the second input device, to a value indicated by the second input device, and set the welding current, when there is not an input from the second input device, to one of: the default value when the default welding current has not been changed, or a welding current that has been changed previously via the second input device.

The control circuitry may be configured to control the power conversion circuitry based on the pre-determined welding-type parameters and the welding current. The pre-determined ones of the welding-type parameters may not be changed while in the preconfigured state. For an attempt to change any of the predetermined ones of the welding-type parameters, the control circuitry is configured to indicate an error by, for example, blinking the visual indication. The indication is a visual indication and may be, for example, the output device is an LED.

The control circuitry may be configured to perform a factory reset when a third input device is selected for a pre-determined time. The first input device may be a button, and selecting the first input device may comprise pressing the button. When the power conversion circuitry is not providing welding current, the control circuitry may be configured to display on a display device the current welding current value. When the power conversion circuitry is providing welding current, the control circuitry is configured to display on a display device one or both of an actual welding current and actual welding voltage.

The present disclosure may also provide for a welding-type power source comprising power conversion circuitry configured to convert input power to welding-type power, a user interface comprising a first input device and an output device, and control circuitry. The control circuitry may be configured to, in response to a first input via the first input device, control the output device to turn on a visual indication to indicate that the welding-type power source is in a preconfigured state, set predetermined ones of the welding-type parameters to respective predetermined values, wherein the predetermined values cannot be changed, and control the power conversion circuitry based on the predetermined values.

The control circuitry may be configured to change the welding current without exiting the preconfigured state. The control circuitry may also be configured to, while in the preconfigured state, when there is an input from a second input device, set a welding current to a value indicated by the second input device, and when there is not an input from the second input device, set the welding current to one of: the default value when the default welding current has not been changed, or a welding current that has been changed previously via the second input device.

The output device is an LED and the first input device is a button, and selecting the first input device comprises pressing the button. The control circuitry may be configured to, in response to the first input device being selected while in the preconfigured state, control the output device to turn off the visual indication to indicate that the welding-type power source is not in a preconfigured state. The control circuitry may be configured to perform a factory reset when the first input device is selected for a pre-determined time. The control circuitry may be configured to display on a first display device at least one of the predetermined values for the plurality of welding-type parameters.

The present disclosure may further provide for a welding-type power source comprising power conversion circuitry configured to convert input power to welding-type power, a user interface comprising a first input device, a second input device, and an output device, control circuitry configured to, when not in a preconfigured state, enter the preconfigured state in response to a first input via the first input device, wherein the control circuitry is configured to, upon entering the preconfigured state, control the output device to turn on a visual indication to indicate that the welding-type power source is in a preconfigured state, set predetermined ones of the welding-type parameters to respective predetermined values, wherein the predetermined values cannot be changed, and control the power conversion circuitry based on the predetermined values.

The control circuitry may be configured to, when in a preconfigured state, exit the preconfigured state in response to a second input via the first input device, where the control circuitry is configured to, upon exiting the preconfigured state, control the output device to turn off the visual indication to indicate that the welding-type power source is not in a preconfigured state. The control circuit is configured to perform a factory reset when the second input device is selected for a pre-determined time.

Furthermore, when the power conversion circuitry is not providing welding current, the control circuitry is configured to display on a display device the current welding current value, and when the power conversion circuitry is providing welding current, the control circuitry is configured to display on a display device one or both of an actual welding current and actual welding voltage.

As used herein, a welding-type power source refers to any device capable of using input power to supply power for welding, cladding, plasma cutting, induction heating, laser (including laser welding, laser hybrid, and laser cladding), carbon arc cutting, gouging, resistive preheating, and/or control circuitry, and control circuitry as well as ancillary circuitry associated therewith, where the device may be, but is not limited to autotransformers, transformers, transformer-rectifiers, inverters, converters, resonant power supplies, quasi-resonant power supplies, switch-mode power supplies, etc.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power source, comprising:
power conversion circuitry configured to convert input power to welding-type power;
a user interface comprising a first input device, a second input device, and an output device; and
control circuitry configured to, in response to a first input via the first input device:
control the output device to output an indication that the welding-type power source is set to a preconfigured state;
set a plurality of welding-type parameters to a respective plurality of predetermined values;

set a welding current, when there is an input from the second input device, to a value indicated by the second input device; and set the welding current, when there is not an input from the second input device, to:
a default value when a default welding current has not been changed, and
a stored value when the default welding current has been changed previously via the second input device.

2. The welding-type power source of claim 1, wherein the control circuitry is configured to control the power conversion circuitry based on the plurality of welding-type parameters and the welding current.

3. The welding-type power source of claim 1, wherein the plurality of the welding-type parameters cannot be changed while set to the preconfigured state.

4. The welding-type power source of claim 1, wherein the control circuitry is configured to indicate an error on a display in response to an attempt to change any of the plurality of the welding-type parameters.

5. The welding-type power source of claim 1, wherein the indication that the welding-type power source is set to the preconfigured state is a visual indication.

6. The welding-type power source of claim 1, wherein the output device is a light emitting diode (LED).

7. The welding-type power source of claim 1, wherein the control circuitry is configured to perform a factory reset when the first input device is selected for a predetermined time.

8. The welding-type power source of claim 1, wherein the first input device is a button, and selecting the first input device comprises pressing the button.

9. The welding-type power source of claim 1, wherein, when the power conversion circuitry is not providing the welding current, the control circuitry is configured to display on a display device the value to which the welding current is set.

10. The welding-type power source of claim 1, wherein, when the power conversion circuitry is providing the welding current, the control circuitry is configured to display on a display device one or both of an actual welding current value and an actual welding voltage value.

11. A welding-type power source, comprising:
power conversion circuitry configured to convert input power to welding-type power;
a user interface comprising a first input device, a second input device, and an output device; and
control circuitry configured to, in response to a first input via the first input device:
control the output device to turn on a visual indication to indicate that the welding-type power source is set to a preconfigured state;
set a plurality of welding-type parameters to a respective plurality of predetermined values, wherein the predetermined values cannot be changed; and
control the power conversion circuitry based on the predetermined values,
wherein the control circuitry is configured to set a welding current to a value indicated by the second input device when there is an input from the second input device while set to the preconfigured state,
wherein the control circuitry is further configured to, while set to the preconfigured state, set the welding current to:
a default value when a default welding current has not been changed and when there is not an input from the second input device, and
a stored value when the default welding current has been changed previously via the second input device.

12. The welding-type power source of claim 11, wherein the control circuitry is configured to change a welding current without exiting the preconfigured state.

13. The welding-type power source of claim 11, wherein the output device is a light emitting diode (LED) and the first input device is a button, and selecting the first input device comprises pressing the button.

14. The welding-type power source of claim 11, wherein the control circuitry is configured to, in response to the first input device being selected while set to the preconfigured state, control the output device to turn off the visual indication to indicate that the welding-type power source is not set to the preconfigured state.

15. The welding-type power source of claim 11, wherein the control circuitry is configured to perform a factory reset when the first input device is selected for a predetermined time.

16. The welding-type power source of claim 11, wherein the control circuitry is configured to display on a first display device at least one of the predetermined values for the plurality of welding-type parameters.

17. A welding-type power source, comprising:
power conversion circuitry configured to convert input power to welding-type power;
a user interface comprising a first input device, a second input device, and an output device;
control circuitry configured to, when not set to a preconfigured state, enter the preconfigured state in response to a first input via the first input device,
wherein the control circuitry is configured to, upon entering the preconfigured state:
control the output device to turn on a visual indication to indicate that the welding-type power source is set to the preconfigured state;
set a plurality of welding-type parameters to a respective plurality of predetermined values, wherein the predetermined values cannot be changed; and
control the power conversion circuitry based on the predetermined values; and
the control circuitry is configured to, when set to the preconfigured state, exit the preconfigured state in response to a second input via the first input device,
wherein the control circuitry is configured to set a welding current to a value indicated by the second input device when there is an input from the second input device while set to the preconfigured state, and
wherein the control circuitry is configured to, upon exiting the preconfigured state, control the output device to turn off the visual indication to indicate that the welding-type power source is not set to the preconfigured state.

18. The welding-type power source of claim 17, wherein the control circuit is configured to perform a factory reset when the first input device is selected for a predetermined time.

19. The welding-type power source of claim 17, wherein:
when the power conversion circuitry is not providing the welding current, the control circuitry is configured to display on a display device the value the welding current value to which it has been set; and when the power conversion circuitry is providing the welding current, the control circuitry is configured to display on the display device one or both of an actual welding current value and an actual welding voltage value.

\* \* \* \* \*